United States Patent [19]

Jensen

[11] 4,164,609
[45] Aug. 14, 1979

[54] BATTERY POST SEAL
[75] Inventor: Henry E. Jensen, Lafayette Hill, Pa.
[73] Assignee: Eltra Corporation, Toledo, Ohio
[21] Appl. No.: 904,074
[22] Filed: May 8, 1978
[51] Int. Cl.² ............................................. H01M 2/06
[52] U.S. Cl. .................................................... 429/183
[58] Field of Search .............................. 429/183, 184

[56]  References Cited
  U.S. PATENT DOCUMENTS

| | | | |
|---|---|---|---|
| 1,012,461 | 12/1911 | Sloan | 429/183 |
| 1,237,733 | 8/1917 | Willard | 429/184 |
| 3,652,340 | 8/1972 | Sharpe et al. | 429/184 |

*Primary Examiner*—Donald L. Walton
*Attorney, Agent, or Firm*—Robert E. Greenstien

[57]  ABSTRACT

An apparatus that provides a fluid seal between a battery post and battery cover. A first stuffing box is located around the battery post. This stuffing box contains an O-ring and a gland fitting which is screwed into the stuffing box for the purpose of squeezing the O-ring to create a fluid seal relationship between the stuffing box and the battery post. A second stuffing box is formed integrally with the battery case. This stuffing box is concentric with the first stuffing box. An O-ring is provided to create a fluid seal between the two stuffing boxes. Movement of the battery post with respect to the battery case is accommodated by movement between the two stuffing boxes.

4 Claims, 3 Drawing Figures

BATTERY POST SEAL

BACKGROUND OF THE INVENTION

This invention relates to storage batteries and in particular, the seals that are used to effect a fluid seal relationship between the battery terminals or posts and the battery case.

In a typical lead-acid storage battery, two battery posts are provided which extend through the battery case, usually through the cover portion. These posts extend from the anode and cathode battery plates. Each plate is constructed in a grid form, and the grid is filled with an active paste material. The electrolyte is usually a sulfuric acid mixture and the battery plate is constructed of a lead alloy such as lead-calcium.

Continuous charging of a lead-acid storage battery produces a gradual accumulation of a lead-oxide deposit within the anode grid. The specific volume of this oxide deposit is 21% greater than the specific volume of the lead alloy of which the plate is constructed. The gradual accumulation of this oxide therefore takes up more space in the grid which resultingly enlarges as the deposit forms. As a result of this enlargement, the plate increases in size and bulges at the edges, and the edges, which are straight in a new battery, become extremely curved. The most immediate consequence of this bulging is that the battery post is pushed upwards through the battery cover. This occurs simply because the post is connected to the upper edge of the anodes, which curves upward as the plate increases in size.

In a typical battery of this type a fluid seal is provided between the battery cover and the post to prevent leakage of the electrolyte from the interior of the battery container and seepage of the electrolyte up the battery post. In the prior art, one form of seal consists of simply an O-ring integrally disposed in the battery case around the battery post. In another type of arrangement, the post passes through a stuffing box that is integral with the cover. This stuffing box contains an O-ring and a gland which is screwed into the stuffing box for the purpose of squeezing the O-ring to achieve a secure seal between the stuffing box and the post. Representative examples of this apparatus are shown in U.S. Pat. No. 1,012,461 and U.S. Pat. No. 1,505,219.

These devices do not per se accommodate upward movement of the post through the battery case. This is because their ability to accommodate this movement is dependent entirely upon the frictional relationship between the post and the sealing apparatus. As the battery ages, however, this relationship changes because the post sustains some physical and dimensional changes. The most noticeable change is a roughened surface and a slight increase in the post's diameter. As a result, the upward movement of the post through the seal of the battery is somewhat restricted. The result of this restriction is that the battery plate and the case are subjected to forces from the plate enlargement which would otherwise not be present if the post could easily move through the seal. These forces can crack the battery plate and also crack the case. Both can severely reduce battery life. Hence, while the prior art devices can provide an effective seal for a new battery, its is clear that they are subject to the effects from the change in post size that occurs with increasing battery age. Thus, they do not provide a post seal, which is effective throughout the battery's service life.

SUMMARY OF THE INVENTION

In accordance with the present invention, the battery post is passed through a stuffing box containing an O-ring and gland fitting. A fluid seal is established between the stuffing box and the post. This stuffing box moves with the post as the plate enlarges. A second stuffing box is constructed integrally with the battery case. This stuffing box is concentric with the first stuffing box. This integral stuffing box also contains an O-ring and gland fitting to establish a seal relationship between the two stuffing boxes. The outer surface of the first stuffing box is smooth. The material used for both stuffing boxes is immune to the electrolyte of the battery and does not permit adherence of dirt or contamination. As the battery post is moved upward with increasing plate enlargement, the inner stuffing box slides within the outer stuffing box. The fluid seal between the interior portion of the battery and the environment is thus determined primarily by the effectiveness of the seal between the two stuffing boxes rather than the seal between the inner stuffing box and the post. Since the interface between the two stuffing boxes remain smooth, the post can move freely upward and therefore neither the battery plate nor the case are subjected to significant forces tending to restrict its movement.

The present invention therefore has for its principal object to provide an apparatus for establishing a fluid seal between the battery post and the battery case which is not determined or dependent upon the characteristics of the battery post.

DETAILED DESCRIPTION

Figure 1:
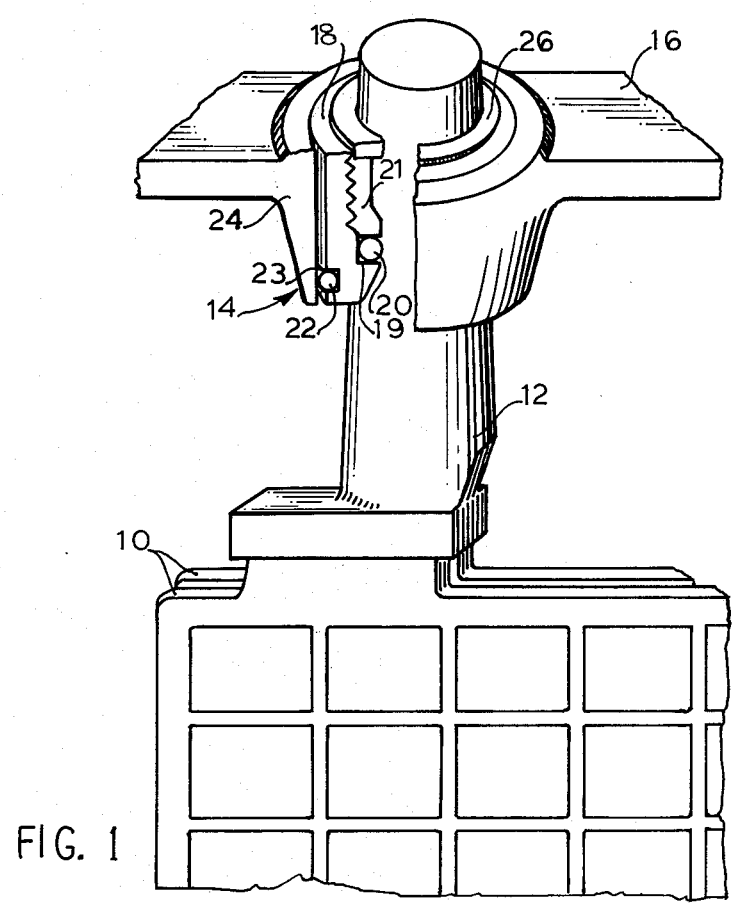
FIG. 1 shows a portion of a battery cell in a cutaway view including one embodiment of the present invention, which is also shown in a cutaway view.

The detailed description of the structure and operation of the present invention now follows with reference first being made to FIG. 1, where a battery cell is shown with one embodiment of the present invention. The cell includes a plurality of battery plates 10 which are conventionally connected in parallel circuit with a battery post 12 that extends through a sealing apparatus 14 from the interior portion of the battery case 16. FIG. 1 shows only a portion of the battery cover 16 through which post 12 passes. It also shows only several of the numerous plates 10 which are connected to the post in a typical battery, which usually has a plurality of cells and, of course, two terminal posts 12. These additional details are not necessary for a full and complete understanding of the structure and operation of the present invention for the reason that the present invention is concerned ostensibly with establishing a fluid seal between the post 12 and a portion of the case 16 immediately adjacent thereto.

As shown in FIG. 1, plate 10 has a grid structure, which as mentioned earlier is typical of lead-acid storage batteries. From this, it can be readily observed why the deposit of the lead-oxide within the grid structure of plate 10 will cause it to expand or bulge and cause post 12 to push upward through cover 16.

FIG. 1, once again depicts a first embodiment of the present invention. The apparatus, designated 14, serves to provide a seal between post 12 and cover 16. Apparatus 14 can be seen to include an inner stuffing box 18 in which an O-ring 20 is placed around post 12. A gland fitting 21 is screwed into inner stuffing box 18. As it is screwed in, it compresses the O-ring against edge 19 in the stuffing box. This causes the O-ring to expand horizontally or along the radius of the post, which establishes a uniform and secure fluid seal between post 12 and stuffing box 18.

The apparatus 14 additionally includes a second O-ring 22 which is disposed in a groove 23 in stuffing box 18. Both O-rings 20 and 22 are constructed of neoprene or a similar resilient material that is immune to the effects of the battery electrolyte and which can maintain its flexibility over a long period of time. Battery cover 16 can be seen to include an integral or outer stuffing box 24. O-ring 22 establishes a fluid seal between the inner stuffing box 18 and the integral stuffing box 24. The expansion of O-ring 20 described previously can be seen to cause the inner stuffing box to be pressed towards the outer stuffing box with the result being that O-ring 22 is pressed against the outer stuffing box 24. In this way, a secure fluid seal is established between the two stuffing boxes 18, 24. An additional seal 26 is provided in the first embodiment around post 12. This consists of a ring of resilient material for the purpose of creating a fluid seal between the post and the gland nut from the exterior of the battery.

A battery utilizing this first embodiment is assembled with the post first passing through the outer stuffing box. The inner stuffing box 18 with O-ring 22 in place 16 is slid down the post until appropriately positioned within the outer stuffing box. O-ring 20 is then slid down post 12 into stuffing box 18. The gland fitting 21 is then screwed into the inner stuffing box 18 and appropriately tightened therein. This causes O-ring 20 to expand in the horizontal direction, as mentioned previously, with the effect being that inner stuffing box 18 is pushed towards the outer stuffing box 24 to compress O-ring 22 sufficiently for an effective seal between the two stuffing boxes. Thus tightening of gland fitting 21 brings about a fluid seal between the post 12 and inner stuffing box 18 as well as a fluid seal between the two stuffing boxes.

With this in mind, it can be observed that inner stuffing box 18 moves with post 12 within outer stuffing box 24. O-ring 22, due to its resiliency, maintains a fluid seal between the two stuffing boxes as the post moves upward. Since the outer edge of stuffing box 24 is smooth, the sliding resistance is small and so the post does not encounter significant resisting forces.

Thus it can be seen that the use of a suitable material which will not allow adherence of contaminants or dirt is important to the operation of the present invention. A typical suitable material is that which is used quite conventionally in the construction of battery cases such as polypropylene or nylon. The O-rings, of course, are constructed of neoprene or similar materials having similar resilient characteristics, as mentioned earlier.

Figure 2:
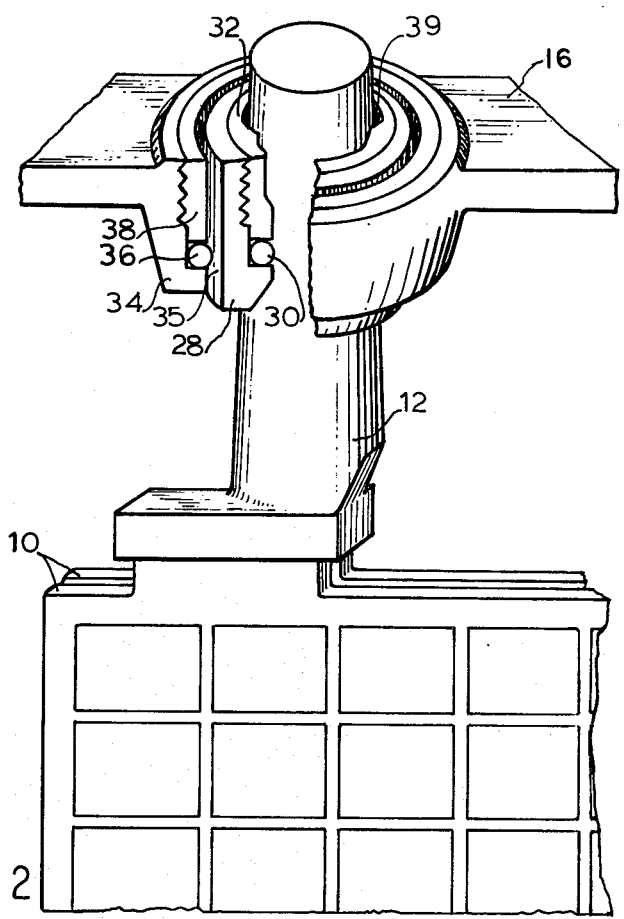
FIG. 2 also shows a portion of a battery cell in a cutaway view, but with a second embodiment of the present invention, which is shown in a cutaway view.

A second embodiment to the present invention is shown in FIG. 2. In this embodiment, inner stuffing box 28 is once again provided together with an O-ring 30 and gland filling 32. These operate in the same manner as described previously with respect to corresponding components in the embodiment shown in FIG. 1.

The second embodiment also includes a stuffing box 34 that is integral with the battery cover 16. In this embodiment, however, O-ring 36 is disposed against the outer edge 35 of stuffing box 28. The stuffing box 34 receives a gland fitting 38 for the purpose of holding O-ring 36 in place. The relative movement between the stuffing boxes 28, 34 as the post moves upward occurs in the same way as described with the first embodiment discussed previously. Likewise the material used for the construction of the parts are identical to that shown and described in the first embodiment.

Figure 3:
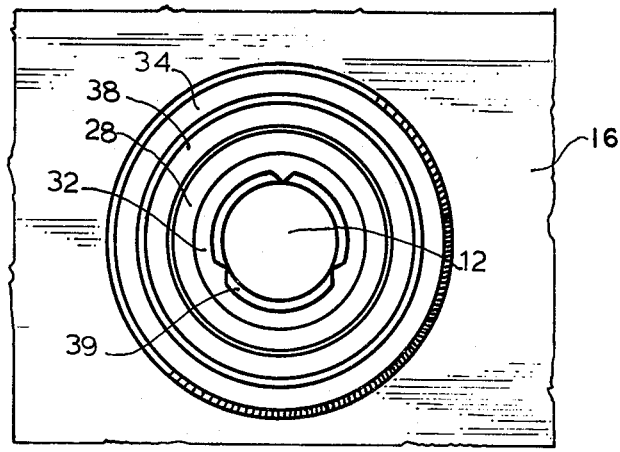
FIG. 3 is a plan view of the second embodiment of the present invention shown in FIG. 2.

The assembly of the battery using the second embodiment is slightly different, however. In particular, the outer stuffing box is once again constructed integrally with cover 16 and is suitably threaded to receive gland fitting 38. The O-ring 36 is then placed into the outer stuffing box 36 as shown. Then the gland fitting 38 is screwed into the outer stuffing box for the purpose of holding the O-ring into position. The aggregate assembly consisting of the inner stuffing box 28, O-ring 30 and gland nut 32 is assembled and then placed over the post 12. Then the assembly is slid down the post, within the outer stuffing box 34, to the desired position. The gland fitting 32, which contains a keyway, 39 as shown in FIG. 3, is then engaged with a suitable tool and is tightened within the inner stuffing box. In a manner much like that described above, the O-ring 30 is thereby expanded in the horizontal direction, against post 12. This pushes the two stuffing boxes 28, 34 together, thereby creating the desired seal between them through O-ring 36, while at the same time, establishing a seal between the inner stuffing box 28 and post 12.

Hence, in both embodiments, the freedom of movement in the vertical direction for post 12 is not determined by the ease with which it moves within a stuffing box or sealing apparatus, but instead, the freedom of movement is determined solely by the frictional and seal relationship between the two stuffing boxes. This frictional arrangement is preset when the inner gland fitting is tightened down, and because of the characteristics of the material used for constructing the stuffing boxes, the friction remains comparatively uniform throughout the life of the battery.

The foregoing has described what is presently the preferred embodiments of the invention. Nevertheless, it will be obvious to those skilled in the art that there are numerous possible modifications and variations that can be made to these embodiments but which nonetheless embrace the invention's true scope and spirit. The following claims are therefore intended to cover all such modifications, equivalents and variations.

I claim:

1. In an electric storage battery having a cover and a terminal post which extends upwardly through an aperture in the cover, an improved terminal post seal which permits upward movement of the terminal post through the aperture comprising a first stuffing box carried by the terminal post, a second stuffing box which is integral with the cover and receives said first stuffing box, a first O-ring seal disposed between the terminal post and said first stuffing box and a second O-ring seal disposed between said first and second stuffing boxes which permits relative movement between said stuffing boxes.

2. The improved seal set forth in claim 1 and further comprising a first gland fitting which threadably engages said first stuffing box, said gland fitting being adapted to compress said first O-ring seal and urge it into sealing engagement with the terminal post and said first stuffing box.

3. The improved seal set forth in claim 2 and further comprising a second gland fitting which threadably engages one of said stuffing boxes, said second gland fitting being adapted to compress said second O-ring seal and urge it into sealing engagement with said stuffing boxes.

4. The improved seal set forth in claim 1 and further comprising a groove in the wall of one of said stuffing boxes within which said second O-ring seal is partially disposed.

* * * * *